United States Patent [19]
Percec

[11] Patent Number: 5,886,118
[45] Date of Patent: Mar. 23, 1999

[54] PROCESS FOR POLYMERIZING ACRYLONITRILE

[75] Inventor: Virgil Percec, Chagrin Falls, Ohio

[73] Assignee: Case Western Reserve University, Cleveland, Ohio

[21] Appl. No.: 843,259

[22] Filed: Apr. 14, 1997

[51] Int. Cl.[6] .................................................. C08F 4/06
[52] U.S. Cl. .................. 526/146; 526/147; 526/201; 526/204; 526/220; 526/222; 526/217; 526/234; 526/341; 526/342; 526/108
[58] Field of Search .................................. 526/217, 234, 526/341, 342, 108, 146, 147, 201, 204, 220, 222

[56] References Cited

U.S. PATENT DOCUMENTS

| | | | |
|---|---|---|---|
| 3,642,719 | 2/1972 | Roest et al. | 526/217 |
| 3,686,112 | 8/1972 | Vrancken et al. | 526/217 |
| 3,687,918 | 8/1972 | Calundann | 526/217 |
| 3,803,073 | 4/1974 | Goltsin et al. | 526/217 |
| 3,816,370 | 6/1974 | Miller et al. | 526/217 |
| 5,235,088 | 8/1993 | Paparizos et al. | 558/324 |
| 5,432,141 | 7/1995 | Brazdil, Jr. et al. | 502/311 |
| 5,466,857 | 11/1995 | Reiling et al. | 558/319 |
| 5,596,058 | 1/1997 | Smierciak et al. | 526/342 |
| 5,602,222 | 2/1997 | Smierciak et al. | 526/342 |

FOREIGN PATENT DOCUMENTS

| | | | |
|---|---|---|---|
| 47-10229 | 3/1972 | Japan | 526/217 |
| 0682181 | 11/1952 | United Kingdom | 526/217 |
| 0752539 | 7/1956 | United Kingdom | 526/217 |
| 1031635 | 6/1966 | United Kingdom | 526/217 |
| 1074878 | 7/1967 | United Kingdom | 526/217 |
| 9630421 | 10/1996 | WIPO . | |

OTHER PUBLICATIONS

Seong Mu Jo et al.; Polymer Preprints, vol. 37, No. 2, Aug. 1996, "Homo–and ABA Block Polymerization of Acrylonitrile, n–Butyl Acrylate, and 2–Ethylhexyl Acrylate Using ATRP", pp. 272–273.

Matyjaszewski; "Control of Molecular Weights, Polydispersities and Functionalities in Controlled/Living Polymerizations. Comparison of Carbocationic and Radical Systems", pp. 325–326.

Beers et al; "The Use of Living Radical Polymerization to Synthesize Graft Copolymers", pp. 571–578.

Wang et al; "Living/Controlled Radical Polymerization. Transition–Metal–Catalyzed Atom Transfer Radical Polymerization in the Presence of a Conventional Radical Initiator", Macromolecules 1995, 28, pp. 7572–7573.

Barboiu et al; "Metal Catalyzed Atom Transfer Living Polymerization Initiated With Arenesulfonyl Chlorides", Abstract of 36th IUPAC International Symposium on Macromolecules, Aug. 4–9, 1996, Seoul, Korea, pp. 6–P01–76 –6–P01–77.

Percec et al; "Extremely Narrow Polydispersity Poly(methyl methacrylate) via Living Radical Polymerization", Aug. 4–9, 1996, Seoul, Korea, p. 68.

Barboiu et al; "Living Radical Polymerization of Acrylonitrile", Abstract of 36th IUPAC International Symposium on Macromolecules, Aug. 4–9, 1996, Seoul, Korea, pp. 672.

Percec et al; "Living Radical Polymerization of Styrene Initiated by Arenesulfonyl Chlorides and $Cu^I(bpy)nCl$", Macromolecules 1995, 28, pp. 7970–7972.

Percec et a; "Metal–Catalyzed Living Radical Polymerization of Styrene Initiated With Arenesulfonyl Chlorides. From Heterogeneous Catalysis", Macromolecules 1996, 29, pp. 3665–3668.

Primary Examiner—Bernard Lipman
Assistant Examiner—N. Sarofin
Attorney, Agent, or Firm—Renner, Otto, Boisselle & Sklar, P.L.L.

[57] ABSTRACT

This invention relates to a process for polymerizing acrylonitrile, comprising: (A) forming a polymerizable mixture comprising acrylonitrile monomer, solvent and a metal catalyst; (B) contacting said mixture with an initiator, said initiator being selected from the group consisting of sulfonyl halides, halopropionitriles, substituted halopropionitriles in the form of monoadducts derived from sulfonyl halides and acrylonitrile, monoadducts derived from substituted sulfonyl halides and monomers other than acrylonitrile; or polymers containing end groups derived from sulfonyl halides, halopropionitriles, substituted halopropionitriles in the form of monoadducts derived from sulfonyl halides and acrylonitrile, or monoadducts derived from substituted sulfonyl halides and monomers other than acrylonitrile; and (C) polymerizing said acrylonitrile monomer to form a polymer comprised of acrylonitrile. In one embodiment, the polymerizable mixture in step (A) further comprises at least one polymerizable comonomer other than acrylonitrile, and the polymer formed during step (C) is a copolymer or a multicomponent copolymer comprised of acrylonitrile and said at least one other polymerizable comonomer.

21 Claims, No Drawings

1

PROCESS FOR POLYMERIZING ACRYLONITRILE

TECHNICAL FIELD

This invention relates to a process for polymerizing acrylonitrile. More particularly, this invention relates to a process for making polymers of acrylonitrile, and copolymers and multicomponent copolymers comprised of acrylonitrile and at least one other polymerizable comonomer.

BACKGROUND OF THE INVENTION

It is known to polymerize acrylonitrile using radical and anionic reactions. These reactions are, however, uncontrolled and techniques for precisely controlling polydispersity and molecular weight of the polymer product are not available.

It would be advantageous to provide a polymerization process wherein precise control of molecular weight and the achievement of a narrow polydispersity could be obtained. Such a process could yield polymers that exhibit highly uniform and reproducible properties based on the achievement of well defined polymeric structures. These advantages are achieved with the present invention.

SUMMARY OF THE INVENTION

This invention relates to a process for polymerizing acrylonitrile, comprising: (A) forming a polymerizable mixture comprising acrylonitrile monomer, solvent and a metal catalyst; (B) contacting said mixture with an initiator, said initiator being selected from the group consisting of sulfonyl halides, halopropionitriles, substituted halopropionitriles in the form of monoadducts derived from sulfonyl halides and acrylonitrile, monoadducts derived from substituted sulfonyl halides and monomers other than acrylonitrile; or polymers containing end groups derived from sulfonyl halides, halopropionitriles, substituted halopropionitriles in the form of monoadducts derived from sulfonyl halides and acrylonitrile, or monoadducts derived from substituted sulfonyl halides and monomers other than acrylonitrile; and (C) polymerizing said acrylonitrile monomer to form a polymer comprised of acrylonitrile. In one embodiment, the polymerizable mixture in step (A) further comprises at least one polymerizable comonomer other than acrylonitrile, and the polymer formed during step (C) is a copolymer comprised of acrylonitrile and said at least one other polymerizable comonomer.

DESCRIPTION OF THE PREFERRED EMBODIMENTS

The monomer that is polymerized in accordance with the inventive process can be acrylonitrile alone, or acrylonitrile in combination with one or more polymerizable comonomers other than acrylonitrile. The other polymerizable comonomer can be any monomer or combination of monomers that is copolymerizable with acrylonitrile monomer. These include acrylonitrile derivatives, acrylates, methacrylates, acrylamides, vinyl esters, vinyl ethers, vinyl amides, vinyl ketones, styrenes, halogen containing monomers, ionic monomers, acid containing monomers, base containing monomers, olefins, and mixtures of two or more thereof. The copolymers produced by the inventive process can be either random or alternating copolymers, block copolymers, graft copolymers, or multiblock copolymers. They can have a comonomer content of up to about 99 mole %, and in one embodiment up to about 90 mole %, and in one embodiment up to about 75 mole %, and in one embodiment up to about 50 mole %, and in one embodiment up to about 25 mole %, and in one embodiment up to about 1 mole %. They can be straight chained or branched. In one embodiment, the polymer produced by the inventive process is an acrylonitrile homopolymer.

The acrylonitrile derivatives include the alkyl substituted acrylonitriles. The alkyl groups typically contain from 1 to about 20 carbon atoms, and in one embodiment 1 to about 10 carbon atoms, and in one embodiment 1 to about 5 carbon atoms. Examples include methacrylonitrile and ethacrylonitrile.

The acrylates include alkyl, aryl and cyclic acrylates such as methyl acrylate, ethyl acrylate, phenyl acrylate, butyl acrylate, 2-ethylhexyl acrylate, isobornyl acrylate and functional derivatives of these acrylates such as 2-hydroxy ethyl acrylate, 2-chloro ethyl acrylate, and the like. These compounds typically contain from 1 to about 12 carbon atoms, and in one embodiment 1 to about 8 carbon atoms. Methyl acrylate and ethyl acrylate are preferred.

The methacrylates include $C_1$ to about $C_{12}$ alkyl, aryl and cyclic methacrylates such as methyl methacrylate, ethyl methacrylate, butyl methacrylate, 2-ethylhexyl methacrylate, phenyl methacrylate, isobornyl methacrylate, and functional derivatives of these methacrylates such as 2-hydroxyethyl methacrylate, 2-chloroethyl methacrylate, and the like. These compounds typically contain from 1 to about 12 carbon atoms, and in one embodiment 1 to about 8 carbon atoms. Methyl methacrylate is preferred.

The acrylamides include acrylamide and its derivatives including the N-substituted alkyl and aryl derivatives thereof. These include N-methyl acrylamide, N,N-dimethyl acrylamide, and the like. The vinyl esters include vinyl acetate, vinyl propionate, vinyl butyrate, and the like, with vinyl acetate being preferred. The vinyl ethers include vinyl ethers having 1 to about 8 carbon atoms including ethylvinyl ether, butylvinyl ether, and the like. The vinyl amides include vinyl amides having 1 to about 8 carbon atoms including vinyl pyrrolidone, and the like. The vinyl ketones include vinyl ketones having 1 to about 8 carbon atoms including ethylvinyl ketone, butylvinyl ketone, and the like.

The styrenes include styrene, indene, and substituted styrenes represented by the formula

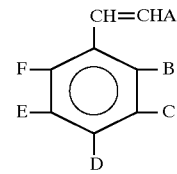

wherein each of A, B, C, D, E and F is independently selected from hydrogen, $C_1$ to about $C_4$ alkyl or alkoxy groups (especially methyl or methoxy groups,) halogroups (especially chloro), thio, cyano, carboxylic acid or ester, or fluorinated alkyl groups of 1 to about 4 carbon atoms.

The halogep-containing monomers include vinyl chloride, vinyl bromide, vinyl fluoride, vinylidene chloride, vinylidene bromide, vinylidene fluoride, halogen substituted propylene monomers, and the like, with vinyl bromide and vinylidene chloride being preferred. The ionic monomers include sodium vinyl sulfonate, sodium styrene sulfonate, sodium methallyl sulfonate, sodium acrylate, sodium methacrylate, and the like, with sodium vinyl sulfonate, sodium styrene sulfonate and sodium methallyl sulfonate being preferred.

The acid containing monomers include acrylic acid, methacrylic acid, vinyl sulfonic acid, itaconic acid, and the like, with itaconic acid and vinyl sulfonic acid being preferred. The base containing monomers include vinyl pyridine, N-amino ethyl acrylamide, N-amino propyl acrylamide, N-aminoethyl acrylate, N-aminoethyl methacrylate, and the like. The olefins include isoprene, butadiene, $C_2$ to about $C_8$ straight chained and branched alpha-olefins such as ethylene, propylene, butylene, isobutylene, diisobutylene, 4-methyl pentene-1, 1-butene, 1-hexene, 1-octene, and the like, with ethylene, propylene and isobutylene 4-methyl pentene-1, 1-butene, 1-hexene, 1-octene, being preferred.

The choice of comonomer or combination of comonomers depends on the properties that are desired for the resulting copolymer or multicomponent copolymer product. The selection of such comonomer(s) is within the skill of the art. For instance, copolymers and multicomponent copolymers can be made with acrylonitrile, methacrylonitrile, and styrene and/or indene that are characterized by relatively high heat distortion and glass transition temperatures. Multicomponent copolymers derived from acrylonitrile, methacrylonitrile and isobutylene generally have good flexibility. Multicomponent copolymers derived from acrylonitrile, methacrylonitrile and acrylates and/or methacrylates are characterized by enhanced processing properties. Multicomponent copolymers derived from acrylonitrile, methacrylonitrile, base containing monomers and/or hydroxyl group containing monomers are usually characterized by good colorability. Multicomponentcopolymers derived from acrylonitrile, methacrylonitrile, and halogen containing monomers generally have good flame resistance characteristics.

The solvent can be any material that is a solvent for the polymer, copolymer or multicomponent copolymer product made by the inventive process. These include o-, m-, or p-phenylene diamine, N-formylhexamethyleneimine, N-nitrosopiperidine, maleic anhydride, chloromaleic anhydride, succinic anhydride, acetic anhydride, citraconic anhydride, γ-butyrolactone, dioxanone, p-dioxanedione, ethylene oxalate, ethylene carbonate, propylene carbonate, 2-oxazolidone, 1-methyl-2-pyridone, 1,5-dimethyl-2-pyrrolidone, ε-caprolactam, dimethyl formamide (DMF), dimethylthioformamide, N-methyl-β-cyanoethylformamide, cyanoaceticacid, α-cyanoacetamide, N-methylacetamide, N,N-diethylacetamide, dimethyl acetamide (DMA), dimethylmethoxyacetamide, N,N-dimethyl-α,α,α-trifluoroacetamide, N,N-dimethylpropionamide, N,N,N',N'-tetramethyloxamide, hydroxyacetonitrile, water, mixtures of water with protic and aprotic organic solvents, supercritical fluids, chloroacetonitrile, chloroacetonitrile/water, β-hydroxypropionitrile, malonitrile, fumaronitrile, succionitrile, adiponitrile, bis(2-cyanoethyl) ether, bis(2-cyanoethyl)sulfide, bis(4-cyanobutyl)sulfone, 1,3,3,5-tetracyanopentane, nitromethane/water (94:6), 1,1,1-trichloro-3-nitro-2-propane, tri(2-cyanoethyl)nitromethane, 3,4-nitrophenol, methylene dithiocyanate, trimethylene dithiocyanate, dimethylene sulfoxide (DMSO), tetramethylene sulfoxide, dimethyl sulfone, ethyl methyl sulfone, 2-hydroxyethyl methyl sulfone, ethylene-1,2-bis-(ethylsulfone), dimethyl phosphite, diethyl phosphite, sulfuric acid, nitric acid, p-phenol sulfonic acid, concentrated aqueous lithium chloride, concentrated aqueous zinc chloride, concentrated aqueous aluminum perchlorate, concentrated aqueous sodium thiocyanate, concentrated aqueous calcium thiocyanate, molten quaternary ammonium salts and their aqueous solutions, and mixtures of two or more thereof. A preferred solvent is ethylene carbonate.

The metal catalyst can be any metal catalyst that is capable of entering into a redox reaction with the initiator. The metals that are useful include Cu, Pd, Ni, Fe, Co, Sm, Zr, Mo, Pt, Re, Mn, W Ru and Rh, or a mixture of two or more thereof, with Cu being especially preferred. In one embodiment, the catalyst is comprised of a mixture of Cu (I) and Cu (II). The metal, which is initially in salt form (e.g., halide, especially chloride or bromide, cyanide, acetate, etc.), is used in combination with an organic ligand forming material which complexes the metal. Examples of the organic ligand forming material include 2,2'-bipyridine and derivatives thereof, the derivatives including those that are disubstituted with alkyl groups, carboxylic ester groups, cyano groups or fluorinated alkyl groups of 1 to about 20 carbon atoms, and in one embodiment about 1 to about 10 carbon atoms. Examples include the 4,4'-dialkyl- 2,2' bypyridines such as 4,4'-dimethyl-2,2'-bypyridine, 4,4'-dinonyl-2,2'-bypyridine, and the like, as well as 4,4'-dicarboxylic ester -2,2' bypyridines, The initiator is a sulfonyl halide, halopropionitrile, substituted halopropionitrile in the form of a monoadduct derived from a sulfonyl halide and acrylonitrile, or a monoadduct derived from a substituted sulfonyl halide and a monomer other than acrylonitrile. The sulfonyl halides include the sulfonyl chlorides and bromides. The sulfonyl halides include substituted and unsubstituted aryl sulfonyl halides, halogenated and nonhalogenated aliphatic hydrocarbon sulfonyl halides, halogenated sulfonyl halides, and polymers containing sulfonyl halides. The substituted aryl sulfonyl halides include the alkyl or alkoxy substituted aryl sulfonyl halides, wherein the alkyl and alkoxy substituents typically have 1 to about 20 carbon atoms, and in one embodiment 1 to about 10 carbon atoms. The halogenated aliphatic hydrocarbon sulfonyl halides are typically comprised of bromine or chlorine atoms, and the aliphatic portion typically contains 1 to about 20 carbon atoms, and in one embodiment 1 to about 10 carbon atoms. Examples of the arylsulfonyl halides that are useful include: ortho-, meta- or para-methyl benzene sulfonyl chloride; ortho-, meta- or para-methoxy benzene sulfonyl chloride; ortho-, meta- or para-chloro benzene sulfonyl chloride; ortho-, meta- or para-fluoro benzene sulfonyl chloride, ortho-, meta- or para-bromo benzene sulfonyl chloride; ortho-, meta- or para-carboxylic ester benzene sulfonyl chloride; and the like. Examples of the halogenated aliphatic hydrocarbon sulfonyl halides include trichloromethylsulfonyl chloride, trifluoromethylsulfonyl chloride, and the like. Examples of the halogenated sulfonyl halides include sulfuryl chloride. The monoadduct that is in the form of a substituted halopropionitrile is an adduct formed by the reaction of any of the above-mentioned sulfonyl halides with acrylonitrile monomer. The monoadduct derived from a substituted sulfonyl halide and a monomer other than acrylonitrile is an adduct formed by the reaction of any of the above-mentioned sulfonyl halides with any of the above-mentioned polymerizable comonomers other than acrylonitrile. Exemplary adducts include the monoadducts formed by the reaction of any of the above-mentioned sulfonyl halides with acrylonitrile, styrene, methyl methacrylate, methyl butyrate, vinyl acetate, ethylene, and the like. In one embodiment, the initiator is a polymer containing end groups derived from any of the foregoing sulfonyl halides, halopropionitriles, substituted halopropionitriles in the form of monoadducts derived from sulfonyl halides and acrylonitrile, or monoadducts derived from substituted sulfonyl halides and monomers other than acrylonitrile. An example of such a polymer to which such end groups can be attached is polyphenylene oxide.

In the practice of the present invention the polymerization process is carried out in solution, emulsion, suspension or in bulk, as a single phase or multiple phases. Pressure can be atmospheric, subatmospheric (e.g., as low as 0.1 mm Hg) or superatmospheric (e.g., about 1 to about 20 atmospheres). In one embodiment, the concentration of the solvent is relatively low. Bulk polymerizations are particularly advantageous. The present invention can be practiced as a semicontinuous or continuous process.

Initially, the acrylonitrile monomer, polymerizable comonomer(s) (if any), and metal catalyst are mixed with the solvent. The monomer content (acrylonitrile monomer and polymerizable comonomer(s), if any) is typically about 50% to about 90% by weight, and in one embodiment about 55% to about 80% by weight of the polymerizable reaction mixture. The solvent content is from about 10% to about 50% by weight, and in one embodiment about 20% to about 45% by weight of the polymerizable reaction mixture.

The polymerizable reaction mixture is placed in a reaction vessel. The reaction vessel is purged with an inert gas, such as nitrogen, argon, and the like. In one embodiment, the inert gas purge is continued throughout the polymerization reaction. The polymerizable reaction mixture is heated to a temperature in the range of about 40° C. to about 120° C., and in one embodiment about 50° C. to about 100° C. The temperature of the polymerization reaction is maintained in this range throughout the process.

The initiator is added to the polymerizable reaction mixture to start the polymerization reaction. The initiator is typically added to the reaction vessel as a single solution. The initiator is added at the beginning to maintain the desired polymerization rate, which can be determined by those skilled in the art. The amount of the initiator that is required is determined by the molecular weight of the polymer that is desired to be prepared. The ratio of the molar concentration of monomer to the molar concentration of the initiator determined at complete conversion is the degree of polymerization of the resulting polymer. This degree of polymerization multiplied by the molecular weight of the monomers determines the molecular weight of the polymer.

In one embodiment, the molar ratio of initiator to metal catalyst is critical and this ratio is from about 1:10 to about 10:1, and in one embodiment about 1:1 to about 1:0.3.

Simultaneously, after, or preferably immediately after the polymerization reaction has been initiated, monomer feed containing acrylonitrile monomer and polymerizable comonomer (if any) is incrementally or continuously added to the polymerization reaction mixture in the reaction vessel. The combined weight of the unreacted acrylonitrile monomer and unreacted comonomer (if any), in the polymerizing mixture, at any time, is generally not greater than about 10% by weight, and in one embodiment not greater than about 7% by weight, and in one embodiment not greater than about 5% by weight based on the total weight of the polymerizing mixture.

The molar ratio of the acrylonitrile monomer to comonomer(s), if any, in the monomer feed is fixed and constant throughout the polymerization process resulting in a homogeneous polymer, copolymer or multicomponent copolymer. The polymer composition is essentially the same as the composition of the monomer feed.

The polymerizing mixture is continuously or intermittently agitated by any known method, such as stirring, shaking, and the like. Preferably, the polymerizing mixture is continuously agitated.

The reaction is continued until polymerization has proceeded to the desired extent, generally from about 40% to about 99% conversion, and in one embodiment from about 70% to about 95% conversion.

The polymerization reaction is stopped by cooling, adding an inhibitor, such as diethyl hydroxylamine, 4-methoxylphenol, and the like, and discontinuing the monomer feed.

At the conclusion of the polymerization reaction the polymer product is separated from the reaction medium using known techniques. These include precipitation using non-solvents, freeze coagulation, salt coagulation, etc. An advantage of one embodiment of this invention is that the polymerization process can be conducted with a relatively low concentration of solvent, and thus the process steps for separating the polymer from the reaction medium are relatively simple and less costly than with the techniques used in the prior art.

The number average molecular weight, $M_n$, of the polymers, copolymers and multicomponent copolymers produced by the inventive process typically ranges from about 200 to about 6 million, and in one embodiment about 2,000 to about 1 million, and in one embodiment about 20,000 to about 200,000. The $M_w/M_n$ ratio typically ranges from about 1.01 to about 2.5, and in one embodiment about 1.1 to about 1.3. An advantage of the inventive process is that the molecular weight and the $M_w/M_n$ ratio can be precisely controlled.

The polymer, copolymer or multicomponent copolymer made by the inventive process may be further processed by spinning, molding, extruding, and the like. Lubricants, dyes, leaching agents, plasticizers, pseudoplasticizers, pigments, delustering agents, stabilizers, static agents, antioxidants, reinforcing agents, fillers, and the like, may be combined with the polymer. These polymers may be utilized in numerous applications such as for use as fibers, sheets, films, pipes, tubings, molded articles, and the like.

The polymers, copolymers and multicomponent copolymers produced by the inventive process provide the particular advantage of being useful in applications that require high gas barrier and solvent resistant such as food and oily product packaging, solvent containers, cap liners, sensitive substance protection and vital ingredient or fragrance/flavor retention. The controlled heat distortion temperature properties of these polymers allows for use in a variety of applications including "hot fill" and sterilization and electrical applications. Controlled clarity via crystallinity and crystal size control provide these polymers with added receptivity. Improved hardness exhibited by these polymers enables their use in making solvent resistant equipment parts and housings. The enhanced crystallinity and orientation that can be achieved with these polymers are highly beneficial and make possible the fabrication of fibers and films with superior performance.

While not wishing to be bound by theory, it is believed that the initiator used with the inventive process (e.g., sulfonyl halide) creates an active species (radicals) which can initiate a controlled chain polymerization process. The role of the catalyst is to activate the initiator (i.e., decrease the activation energy of initiation and therefore the temperature at which it will initiate). Conventional radical polymerizations are accompanied by termination and chain transfer reactions and therefore the molecular weight, the polydispersity and the structure of the polymer end groups can not be controlled. With the present invention, on the other hand, the specific combination of initiator and catalyst employed therein overcomes these problems. In the first step of the initiation, the catalyst reduces the radical initiator (e.g., sulfonyl halide is reduced to a sulfonyl radical) via a redox process and as a result the catalyst becomes oxidized. The reduced initiator (e.g., sulfonyl radical) can either react with the monomer (e.g., acrylonitrile monomer) or react with the oxidized catalyst to regenerate the starting radical initiator (e.g., sulfonyl halide). This is a reversible process. This process of reversibly creating and terminating radicals takes place not only during the initiation phase of the process but also during the propagation phase of the process. This creates a reversible termination reaction. This termination reaction provides a rapid exchange between the active propagating radicals which, in one embodiment, are in an extremely low concentration and the dormant halide terminated growing chains. Under these circumstances, the propagating radicals react predominantly with the monomer (propagation) and terminate with the catalyst (reversible termination) and thus suppress the conventional irreversible termination and chain transfer processes. When these conventional side reactions are eliminated, the polymerization process becomes controlled and therefore behaves like a living polymerization process. The first requirement of a living polymerization process requires a quantitative initiation reaction and at the same time an initiation reaction which is faster than the propagation reaction. The second requirement is the absence of irreversible termination and chain transfer reactions. Under these conditions, the molecular weight of the polymer can be designed in advance since it is determined by the ratio between the concentration of the monomer and the initiator. Since initiation is faster than propagation and quantitative, the resulting polymer has one chain end derived from the radical part of the initiator and one chain end derived from the halide group of the initiator. If the radical initiator has two, three or more halide groups (e.g., sulfonyl halide groups) the polymer growth can be in two, three or more directions and as a result star polymers, block copolymers, graft copolymers, branched and hyperbranched polymers and copolymers can be formed. The chain end of the polymer derived from the halide group can be utilized for the initiation of a second polymerization with a different monomer to provide block copolymers or star block copolymers. The polymer chain end derived from the radical part of the initiator can be used for other reactions including block copolymerizations.

The following examples are provided for purposes of illustrating the invention. Unless otherwise indicated, in the following examples as well as throughout the specification and claims, all parts and percentages are by weight, all temperatures are in degrees Celsius, and all pressures are atmospheric.

EXAMPLE 1

The following ingredients are introduced successively into a 25 ml Schlenk tube equipped with magnetic stirrer and septum: 3.4 mg of CuBr, 8 mg of 2,2'-bipyridine, and 2 ml of acrylonitrile (AN). 2 ml of ethylene carbonate (EC) are heated to 80° C. and added to the mixture. The mixture is stirred for 5 min after which 4 ml of 2-bromopropionitrile (BPN) is injected. The molar ratio of AN to BPN is 560/1. Oxygen is removed using four freeze-pump-thaw cycles. The polymerization is carried out at 60° C. for 61 hours. The polymerization mixture is diluted with 2 ml of dimethyl formamide (DMF). The polymer is precipitated by adding 5 ml of methanol and 5 ml of tetrahydrofuran (THF) in the Schlenk tube. The precipitate is filtered and dried to yield 1 g of white polyacrylonitrile (PAN). The conversion is 62%. The $M_n$ is 30,000 and the $M_w/M_n$ is 1.17 (by GPC in DMF at 40° C. and using polyethylene glycol (PEG) standards).

EXAMPLE 2

The polymerization of Example 1 is repeated except that the initiator is 2-chloropropionitrile (CPN) rather than BPN. The amounts of materials used are as follows: 11 mg of CuCl, 34 mg of 2,2'-bipyridine, 2 ml of AN, 1 ml of EC and 20 μl of 2-chloropropionitrile (CPN). The molar ratio of AN to CPN is 130/1. After 2 hours at 100° C. the conversion is 56% (yield=0.90 g). The $M_n$ is 6,000 and $M_w/M_n$ is 1.15 (by GPC in DMF at 40° C. and using PEG standards).

EXAMPLE 3

The polymerization Example 1 is repeated except that the initiator is p-methoxybenzene sulfonyl chloride (MBSC) rather than BPN, and the catalyst is CuCl/2,2'-bipyridine rather than CuBr/2,2'-bipyridine. The molar ratio of AN to MBSC is 100/1. The molar ratio of CuCl to 2,2'-bypyridine is 1/2. The polymerization is carried out for 20 hours. The polymerization temperature and the MBSC/CuCl molar ratio are varied as indicated below. The results are as follows:

| Example | MBSC/CuCl | T(°C.) | Conversion (%) | Mn | Mw/Mn |
|---|---|---|---|---|---|
| 3-A | 1/0.8 | 100 | 86 | 6500 | 2.11 |
| 3-B | 1/0.8 | 80 | 71 | 7800 | 1.40 |
| 3-C | 1/0.4 | 100 | 94 | 10200 | 1.27 |
| 3-D | 1/0.4 | 80 | 76 | 7300 | 1.45 |

EXAMPLE 4

The polymerization of Example 1 is repeated except that a comonomer is polymerized with the AN, and MBSC is used as the initiator rather than BPN. The comonomer is MA (methacrylate), S (styrene), MMA (methyl methacrylate), or MAN (methacrylonitrile), as indicated below. The molar ratio of AN to comonomer is 10.1/0.7. The molar ratio of CuBr to 2,2'-bipyridine (bpy) is 0.5/1. The molar ratio of AN/MBSC/CuBr/bpy is 100/1/0.5/1. The polymerization is carried out for 16 hours at 100° C. The results are as follows:

| Example | Comonomer | Conversion (%) | Mn | Mw/Mn |
|---|---|---|---|---|
| 4-A | MA | 94 | 6710 | 1.38 |
| 4-B | S | 92 | 5030 | 1.43 |
| 4-C | MMA | 96 | 7440 | 1.31 |
| 4-D | MAN | 91 | 11100 | 1.24 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A process for polymerizing acrylonitrile, comprising:
   (A) forming a polymerizable mixture comprising acrylonitrile monomer, solvent and a metal catalyst;
   (B) contacting said mixture with an initiator, said initiator being selected from the group consisting of sulfonyl halide, halopropionitrile, substituted halopropionitrile in the form of a monoadduct derived from a sulfonyl halide and acrylonitrile, a monoadduct derived from a substituted sulfonyl halide and a monomer other than acrylonitrile; and polymers containing end groups derived from sulfonyl halides, halopropionitriles, substituted halopropionitriles in the form of monoadducts derived from sulfonyl halides and acrylonitrile, or monoadducts derived from substituted sulfonyl halides and monomers other than acrylonitrile;

(C) polymerizing said acrylonitrile monomer to form a polymer comprised of acrylonitrile.

2. The process of claim 1 wherein said polymerizable mixture in step (A) further comprises at least one polymerizable comonomer other than acrylonitrile, and the polymer formed in step (C) is a copolymer comprised of acrylonitrile and at least one other polymerizable comonomer.

3. The process of claim 2 wherein said polymerizable comonomer is an acrylonitrile derivative, acryl ate, methacrylate, acrylamide, vinyl ester, vinyl ether, vinyl amide, vinyl ketone, styrene, halogen containing monomer, ionic monomer, acid containing monomer, base containing monomer, olefin or mixture of two or more thereof.

4. The process of claim 2 wherein said polymerizable comonomer is selected from the group consisting of methyl acrylate, ethyl acrylate, methyl methacrylate, methacrylonitrile, vinyl acetate, styrene, ethylene, propylene, isobutylene, 4-methyl pentene-1,1-butene, 1-hexene, 1-octene, and mixtures of two or more thereof.

5. The process of claim 1 wherein said solvent is selected from the group consisting of o-, m-, or p-phenylene diamine, N-formylhexamethyleneimine, N-nitrosopiperidine, maleic anhydride, chloromaleic anhydride, succinic anhydride, acetic anhydride, citraconic anhydride, γ-butyrolactone, dioxanone, p-dioxanedione, ethylene oxalate, ethylene carbonate, propylene carbonate, 2-oxazolidone, 1-methyl-2-pyridone, 1,5-dimethyl-2-pyrrolidone, ε-caprolactam, dimethyl formamide (DMF), dimethylthioformamide, N-methyl-β-cyanoethylformamide, cyanoaceticacid, α-cyanoacetamide, N-methylacetamide, N,N-diethylacetamide, dimethyl acetamide (DMA), dimethylmethoxyacetamide, N,N-dimethyl-α,α,α-trifluoroacetamide, N,N-dimethylpropionamide, N,N,N', N'-tetramethyloxamide, hydroxyacetonitrile, water, mixtures of water with protic and aprotic organic solvents, supercritical fluids, chloroacetonitrile, chloroacetonitrile/water, β-hydroxypropionitrile, malonitrile, fumaronitrile, succionitrile, adiponitrile, bis(2-cyanoethyl)ether, bis(2-cyanoethyl)sulfide, bis(4-cyanobutyl)sulfone, 1,3,3,5-tetracyanopentane, nitromethane/water (94:6), 1,1,1-trichloro-3-nitro-2-propane, tri(2-cyanoethyl)nitromethane, 3-,4-nitrophenol, methylene dithiocyanate, trimethylene dithiocyanate, dimethylene sulfoxide (DMSO), tetramethylene sulfoxide, dimethyl sulfone, ethyl methyl sulfone, 2-hydroxyethyl methyl sulfone, ethylene-1,2-bis-(ethylsulfone), dimethyl phosphite, diethyl phosphite, sulfuric acid, nitric acid, p-phenol sulfonic acid, concentrated aqueous lithium chloride, concentrated aqueous zinc chloride, concentrated aqueous aluminum perchlorate, concentrated aqueous sodium thiocyanate, concentrated aqueous calcium thiocyanate, molten quaternary ammonium salts and their aqueous solutions, and mixtures of two or more thereof.

6. The process of claim 1 wherein said solvent is ethylene carbonate.

7. The process of claim 1 wherein said metal catalyst is comprised of Cu, Pd, Ni, Fe, Ru, Rh, Co, Sm, Zr, Mo, Re, Mn, W or a mixture of two or more thereof.

8. The process of claim 1 wherein said metal catalyst is complexed with an organic ligand forming material.

9. The process of claim 1 wherein said metal catalyst is copper complexed with 2,2'-bypyridine or a derivative thereof.

10. The process of claim 1 wherein said initiator is 2-bromoproprionitrile, 2-chloropropionitrile, or a monoadduct derived from a sulfonyl chloride and acrylonitrile, or a monoadduct derived from a substituted sulfonyl chloride and a monomer other than acrylonitrile.

11. The process of claim 1 wherein said initiator is an aryl sulfonyl halide or a substituted aryl sulfonyl halide.

12. The process of claim 1 wherein said initiator is a halogenated or nonhalogenated aliphatic hydrocarbon sulfonyl halide.

13. The process of claim 1 wherein said initiator is ortho-, meta- or para-methyl benzene sulfonyl chloride; ortho-, meta- or para-methoxy benzene sulfonyl chloride; ortho-, meta- or para-chloro benzene sulfonyl chloride; ortho-, meta- or para-fluoro benzene sulfonyl chloride;

ortho-, meta- or para-bromo benzene sulfonyl chloride; or ortho-, meta- or para-carboxylic ester benzene sulfonyl chloride.

14. The process of claim 1 wherein said initiator is trichloromethyl sulfonyl chloride or trifluoromethyl sulfonyl chloride.

15. The process of claim 1 wherein said initiator is sulfuryl chloride.

16. The process of claim 1 wherein said polymerizable mixture in step (A) has a monomer content of about 50% to about 90% by weight, and a solvent content of about 10% to about 50% by weight.

17. The process of claim 1 wherein the molar ratio of initiator to metal catalyst is from about 1:10 to about 10:1.

18. The process of claim 1 wherein said polymer has a number average molecular weight in the range of about 200 to about 6 million.

19. The process of claim 1 wherein the Mw/Mn for said polymer is from about 1.01 to about 2.5.

20. A process for polymerizing acrylonitrile, comprising:

(A) forming a polymerizable mixture comprising acrylonitrile monomer, ethylene carbonate, copper halide, and 2,2'-bypyridine or a derivative thereof;

(B) contacting said mixture with a sulfonyl halide; and (C) polymerizing said acrylonitrile monomer to form a polymer comprised of acrylonitrile.

21. A process for polymerizing acrylonitrile, comprising:

(A) forming a polymerizable mixture comprising acrylonitrile monomer, at least one polymerizable comonomer, copper halide, and 2,2'-bypyridine or a derivative thereof;

(B) contacting said mixture with a sulfonyl halide; and (C) polymerizing said acrylonitrile monomer and said at least one comonomer to form a copolymer or multi-component copolymer comprised of acrylonitrile and said at least one comonomer.

* * * * *

REEXAMINATION CERTIFICATE (4276th)
United States Patent
Percec

(10) Number: US 5,886,118 C1
(45) Certificate Issued: Feb. 20, 2001

(54) PROCESS FOR POLYMERIZING ACRYLONITRILE

(75) Inventor: Virgil Percec, Chagrin Falls, OH (US)

(73) Assignee: Case Western Reserve University, Cleveland, OH (US)

Reexamination Request:
No. 90/005,627, Feb. 2, 2000

Reexamination Certificate for:
Patent No.: 5,886,118
Issued: Mar. 23, 1999
Appl. No.: 08/843,259
Filed: Apr. 14, 1997

(51) Int. Cl.$^7$ ........................................ C08F 4/06
(52) U.S. Cl. ........................ 526/146; 526/108; 526/147; 526/201; 526/204; 526/220; 526/217; 526/222; 526/234; 526/341; 526/342
(58) Field of Search ........................ 526/108, 146, 526/147, 201, 204, 217, 220, 222, 234, 341, 342

(56) References Cited

U.S. PATENT DOCUMENTS 5,789,487 8/1998 Matyjaszewski et al. .
5,807,937 9/1998 Matyjaszewski et al. .

*Primary Examiner*—Bernard Lipman

(57) ABSTRACT

This invention relates to a process for polymerizing acrylonitrile, comprising: (A) forming a polymerizable mixture comprising acrylonitrile monomer, solvent and a metal catalyst; (B) contacting said mixture with an initiator, said initiator being selected from the group consisting of sulfonyl halides, halopropionitriles, substituted halopropionitriles in the form of monoadducts derived from sulfonyl halides and acrylonitrile, monoadducts derived from substituted sulfonyl halides and monomers other than acrylonitrile; or polymers containing end groups derived from sulfonyl halides, halopropionitriles, substituted halopropionitriles in the form of monoadducts derived from sulfonyl halides and acrylonitrile, or monoadducts derived from substituted sulfonyl halides and monomers other than acrylonitrile; and (C) polymerizing said acrylonitrile monomer to form a polymer comprised of acrylonitrile. In one embodiment, the polymerizable mixture in step (A) further comprises at least one polymerizable comonomer other than acrylonitrile, and the polymer formed during step (C) is a copolymer or a multi-component copolymer comprised of acrylonitrile and said at least one other polymerizable comonomer.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11–15, 20 and 21 is confirmed.

Claims 1–10 and 16–19 are cancelled.

\* \* \* \* \*